(12) United States Patent
Fortin

(10) Patent No.: US 11,001,128 B2
(45) Date of Patent: May 11, 2021

(54) DOOR MODULE FOR VEHICLE DOOR HAVING INTEGRATED SOUND SUPPRESSION AND DAMPENING ARRANGEMENT

(71) Applicant: MAGNA CLOSURES INC., Newmarket (CA)

(72) Inventor: Raymond Edward Fortin, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 143 days.

(21) Appl. No.: 16/451,068

(22) Filed: Jun. 25, 2019

(65) Prior Publication Data

US 2020/0001688 A1    Jan. 2, 2020

Related U.S. Application Data

(60) Provisional application No. 62/690,426, filed on Jun. 27, 2018.

(51) Int. Cl.
*B60J 5/04* (2006.01)
(52) U.S. Cl.
CPC ............. *B60J 5/0418* (2013.01); *B60J 5/045* (2013.01); *B60J 5/0452* (2013.01)
(58) Field of Classification Search
CPC ........ B60J 5/0418; B60J 5/0452; B60J 5/045; B60J 5/0412; B60J 5/0413; B60J 5/0415; B60R 11/0217; B60R 2011/0021; B60R 2011/0075

USPC ....................................................... 296/146.7
See application file for complete search history.

(56) References Cited

U.S. PATENT DOCUMENTS

| | | | |
|---|---|---|---|
| 5,902,004 A * | 5/1999 | Waltz ..................... | B60J 5/0416 296/146.9 |
| 6,205,714 B1 * | 3/2001 | Staser .................... | B60J 5/0416 296/146.6 |
| 6,367,202 B1 | 4/2002 | Reed et al. | |
| 6,422,640 B2 * | 7/2002 | Whitehead ............ | B60J 5/0418 296/146.7 |
| 6,536,164 B1 | 3/2003 | Kirejczyk | |
| 6,979,047 B2 | 12/2005 | Lin et al. | |

(Continued)

FOREIGN PATENT DOCUMENTS

| | | |
|---|---|---|
| EP | 1169188 B1 | 6/2006 |
| EP | 1675739 B1 | 12/2008 |

(Continued)

*Primary Examiner* — Pinel E Romain
(74) *Attorney, Agent, or Firm* — Dickinson Wright PLLC

(57) ABSTRACT

A vehicle panel assembly for a motor vehicle includes a structural door panel body having an inner door panel and an outer door panel defining an internal cavity. A carrier module is secured to the structural door panel body. The carrier module has a carrier having an outer periphery for attachment to the inner door panel to substantially close off an opening therein to separate a wet side of the door panel body from a dry side of the door panel body and having a recessed pocket configured for receipt of a rear side of a speaker therein to maintain the speaker on the dry side of the door panel body. At least one of a barrier and shroud is coupled to the carrier. The barrier forms an air pocket with the carrier on a side of the carrier facing the wet side of the structural door panel body.

20 Claims, 12 Drawing Sheets

(56) References Cited

U.S. PATENT DOCUMENTS

| | | | |
|---|---|---|---|
| 7,364,218 B2* | 4/2008 | Radu | B29C 45/1676 |
| | | | 296/146.7 |
| 7,992,347 B2 | 8/2011 | Roy et al. | |
| 8,020,919 B2* | 9/2011 | Lin | B60J 5/0468 |
| | | | 296/146.7 |
| 8,045,744 B2 | 10/2011 | Close | |
| 9,315,159 B2 | 4/2016 | Muller | |
| 9,511,652 B2* | 12/2016 | Barr | B60J 5/0416 |
| 9,511,658 B2* | 12/2016 | Hawighorst | B60K 1/04 |
| 10,406,893 B2* | 9/2019 | Costigan | E06B 3/36 |

FOREIGN PATENT DOCUMENTS

| | | |
|---|---|---|
| FR | 2762263 A1 | 10/1998 |
| FR | 2796902 A1 | 2/2001 |
| WO | WO2005075226 A1 | 8/2005 |
| WO | WO2014006290 A1 | 1/2014 |

* cited by examiner

1000

1100 — molding a carrier having an outer periphery configured for attachment to an inner door panel of a door panel body about an opening in the inner door panel to separate a wet side of the door panel body from a dry side of the door panel body and having a recessed pocket being substantially free of through openings, the recessed pocket being configured for receipt of a rear side of a speaker therein 1200 — fixing a barrier to the carrier, the barrier being fixed to a side of the carrier facing the wet side of the door panel body, with the barrier and the carrier bounding a chamber therebetween 1300 — fixing a shroud to the carrier, the shroud being configured to overlie the pocket on the dry side of the door panel body

FIG. 7

DOOR MODULE FOR VEHICLE DOOR HAVING INTEGRATED SOUND SUPPRESSION AND DAMPENING ARRANGEMENT

CROSS-REFERENCE TO RELATED APPLICATION

This application claims the benefit of U.S. Provisional Application Ser. No. 62/690,426, filed Jun. 27, 2018, which is incorporated herein by way of reference in its entirety.

FIELD

The present disclosure relates generally to vehicle closure panel assemblies, and more particularly to carrier assemblies therefor configured to support a speaker of a sound system.

BACKGROUND

This section provides background information related to vehicle closure panels and carrier modules, also referred to as carrier assemblies, therefor to provide a better understanding of currently available configurations and adaptations of such vehicle closure panels and carrier assemblies. However, the information provided in this section is not necessarily considered to be prior art with respect to the inventive concepts associated with the present disclosure.

As shown in FIG. 1, vehicle closure panels 1, such as a sliding or swing door of a motor vehicle, for example, typically include a carrier module 2 configured to separate a "wet side" 3 (facing outwardly from the carrier module 2 toward an outside environment E and away from an interior cabin C of the motor vehicle) of the door 1 from a "dry side" 4 (facing inwardly from the carrier module 2 away from the outside environment E and toward the interior cabin C of the motor vehicle) of the door 1. The carrier module 2 is commonly configured to support a speaker 5 of a vehicle sound system in mounted relation thereon. In order to accommodate the speaker 5, the carrier module 2 is typically provided with a through opening 6 sized for receipt and mounting of the speaker 5 therein. An outer periphery of the speaker 5 is typically fixed against a dry face 7 (side of carrier facing dry side 4) of the carrier module 2, while a rear side of the speaker 5 extends through the through opening 6 and is typically openly exposed to the wet side 3 within a cavity 8 defined between the carrier module 2 and an outer door panel 9. As such, aside from the presence of the speaker 5, the through opening 6 establishes an open air flow path between the wet side 3 and the dry side 4.

Some drawbacks of mounting the speaker 5 within the through opening 6 of the carrier module 2 include the transmission of sound from the interior cabin C to the outside environment E, and vice versa, through the through opening 6 along the direction indicated by arrows A. As such, conversation within the interior cabin C, whether between passengers within the interior cabin C or between a passenger within the interior cabin C and a person remote from the vehicle via phone conversation, particularly during hands free phone communication, can often be heard by a bystander in the outside environment E. Accordingly, the privacy of conversation occurring within the interior cabin C can be compromised. Further, noise emanating in the outside environment E can enter the interior cabin C through the through opening 6 along the direction of arrows A, thereby making conversation within the interior cabin C difficult, aside from creating a general annoyance and being disruptive to a relaxing, quiet environment within the interior cabin C. In addition, the sound from the speaker 56 is generally able to escape outwardly to the outside environment E, thereby reducing the amount of sound desired to be directed to the interior cabin C. Additionally, by having the rear side of the speaker 5 exposed to the wet side, the likelihood of the speaker 5 becoming wet is increased, which ultimately could have a deleterious effect on the useful life of the speaker 5. Further yet, the ability to secure the speaker 5 in relatively rigid fashion to the carrier module 2 can be compromised, given the carrier module 2 is typically a single layer or sheet of material which can generally flex freely, thereby negatively impacting the performance of the speaker 5, as speaker performance is typically enhanced via rigid mounting.

Thus, for at least those reasons discussed above, a need exists to develop optimized closure panel assemblies and carrier modules therefor.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a vehicle closure panel and a carrier module for the vehicle closure panel which advances the art and improves upon currently known vehicle closure panels and carrier modules for such vehicle closure panels.

In another aspect, the present disclosure is directed to a vehicle door and a carrier module for the vehicle door which advances the art and improves upon currently known vehicle doors and carrier assemblies for such vehicle doors.

In a related aspect, a vehicle door carrier module for a motor vehicle structural door panel body including an outer door panel and an inner door panel defining an internal cavity therebetween, wherein the inner door panel is formed having an opening, is provided. The vehicle door carrier module includes a carrier having an outer periphery configured for attachment to the inner door panel about the opening therein to separate a wet side of the door panel body from a dry side of the door panel body. The carrier is formed having a recessed pocket, radially inwardly of the outer periphery, configured for receipt of a rear side of a speaker therein. In a related aspect, the recessed pocket is free or substantially free of through openings.

In accordance with a further aspect, a barrier can be fixed to a side of the carrier facing the wet side of the door panel body, with the barrier and the carrier bounding an air chamber therebetween, with the air chamber being immediately behind the speaker.

In accordance with a further aspect, a sound dampening material can be disposed inside the air chamber.

In accordance with a further aspect, the sound dampening material can be bonded to at least one of a backside of the recessed pocket facing the wet side of the door panel body and a side of the barrier facing the dry side of the door panel body.

In accordance with a further aspect, the barrier can be impervious, thereby enhancing the sound barrier properties of the barrier and preventing the passage of debris and other forms of contamination therethrough.

In accordance with a further aspect, the recessed pocket of the carrier can be impervious, thereby enhancing the sound barrier properties of the carrier and preventing the passage of debris and other forms of contamination therethrough.

In accordance with a further aspect, a shroud can be configured to overlie the speaker and the pocket on the dry side of the door panel body.

In accordance with a further aspect, the pocket can be bounded in part by an annular pocket wall extending toward the dry side of the door panel body and the shroud can have an annular, tubular shroud wall extending toward the wet side of the door panel body, wherein the annular pocket wall and the annular, tubular shroud wall extend in overlapping relation with one another to form a serpentine air flow labyrinth therebetween.

In accordance with a further aspect, a plurality of mount features can extend from the carrier within the pocket, with the mount features being configured for mounting the speaker thereto.

In accordance with yet a further aspect, a sound dampening material can be bonded to a backside of the recessed pocket facing the wet side of the door panel body.

In accordance with yet a further aspect, a vehicle panel assembly is provided including a structural door panel body having an outer door panel and an inner door panel defining an internal cavity therebetween, with the inner door panel having an opening. The vehicle panel assembly further includes a carrier having an outer periphery configured for attachment to the inner door panel to substantially close off the opening therein to separate a wet side of the structural door panel body from a dry side of the structural door panel body. The carrier has a recessed pocket, radially inwardly of the outer periphery, configured for receipt of a rear side of a speaker therein. The vehicle panel assembly further includes at least one of a barrier coupled to the carrier on a side of the carrier facing the wet side of the structural door panel body in laterally spaced relation from the recessed pocket, and a shroud overlying the recessed pocket in laterally spaced relation from the recessed pocket on a side of the carrier facing the dry side of the structural door panel body.

In accordance with yet a further aspect, a vehicle panel assembly is provided. The vehicle panel assembly includes a structural door panel body having an outer door panel and an inner door panel defining an internal cavity therebetween. The inner door panel has an opening, and a carrier is provided having an outer periphery configured for attachment to the inner door panel about the opening to substantially close off the opening and separate and seal off a wet side of the door panel body from a dry side of the door panel body. The carrier has a recessed pocket, radially inwardly of the outer periphery, configured for receipt of a rear side of a speaker therein, In a related aspect, the recessed pocket is free or substantially free of through openings, such that the speaker is maintained in its entirety on the dry side of the carrier.

In accordance with yet a further aspect, a method of constructing a vehicle door carrier module for a motor vehicle having a structural door panel body including an outer door panel and an inner door panel defining an internal cavity therebetween, with the inner door panel having an opening, is provided. The method of constructing the vehicle door carrier module includes: molding a carrier having an outer periphery configured for attachment to the inner door panel about the opening therein to separate a wet side of the door panel body from a dry side of the door panel body and molding the carrier having a recessed pocket, the recessed pocket being configured for receipt of a rear side of a speaker therein. In a related aspect, the recessed pocket is free or substantially free of through openings.

In accordance with yet a further aspect, the method of constructing the vehicle door carrier module can further include fixing at least one of a barrier and a shroud to the carrier. The barrier can be fixed to a side of the carrier facing the wet side of the door panel body, with the barrier and the carrier bounding an air chamber therebetween. The shroud can be configured to overlie the pocket on the dry side of the door panel body.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

These and other aspects, features and advantages of the present embodiments will be readily appreciated, as the same becomes better understood by reference to the following detailed description and appended claims when considered in connection with the accompanying drawings, wherein:

FIG. 7 is a flow diagram illustrating a method of constructing a carrier module in accordance with another aspect of the disclosure.

DETAILED DESCRIPTION OF EXAMPLE EMBODIMENTS

Figure 1:
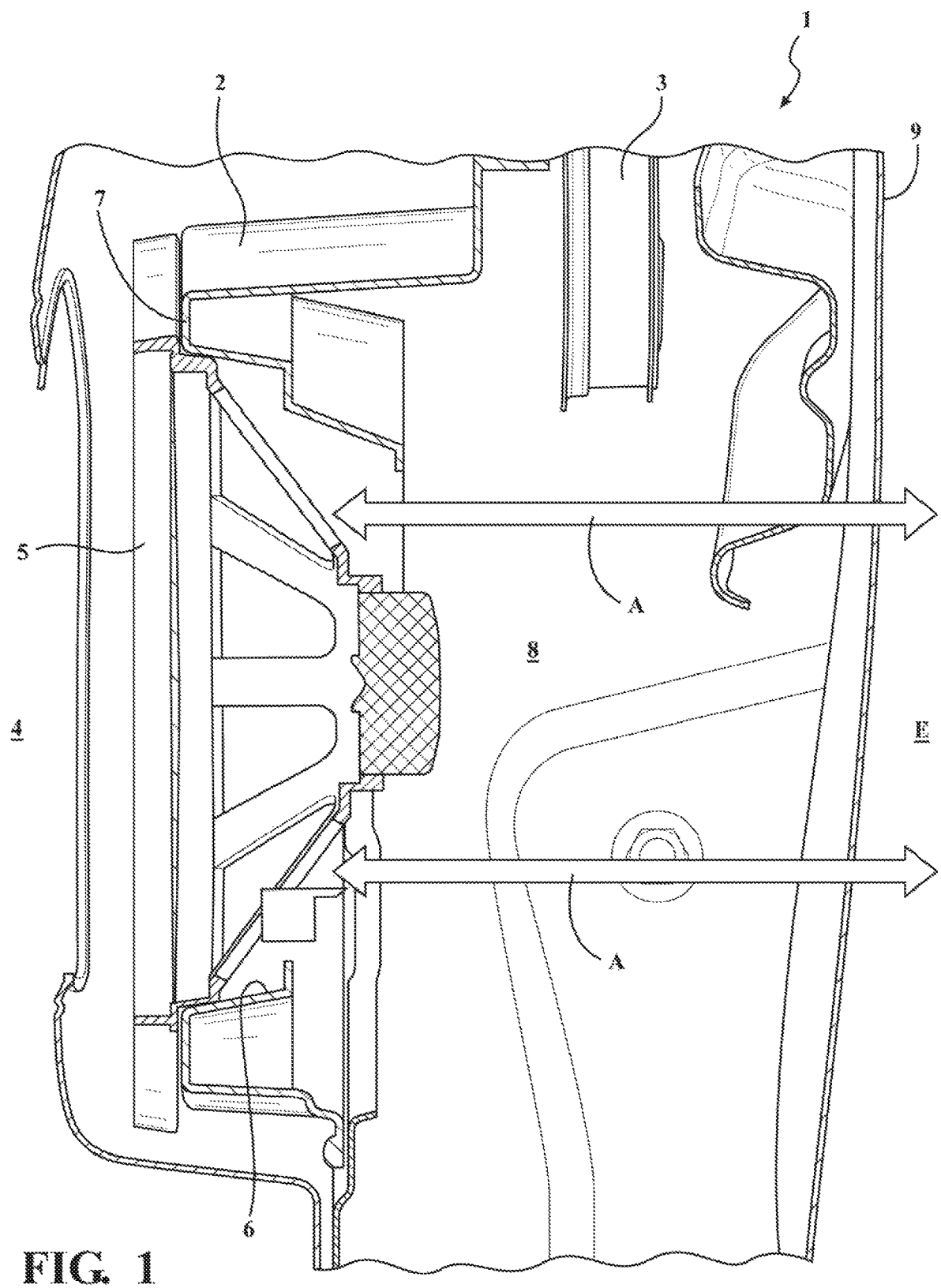
FIG. 1 is a cross-sectional view of a portion of a closure panel constructed in accordance with the prior art.

The example embodiments will now be described more fully with reference to the accompanying drawings.

One or more example embodiments of a carrier module for a vehicle closure panel are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
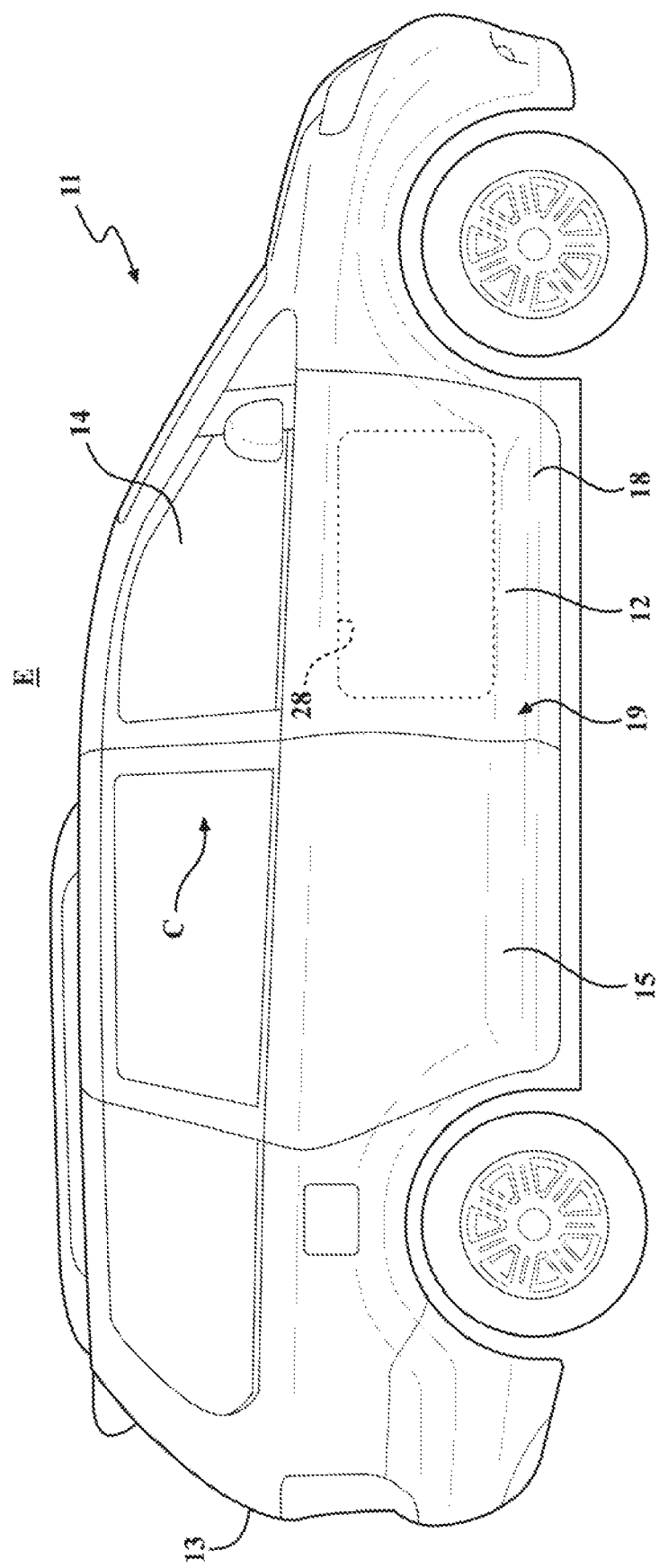
FIG. 2 illustrates a vehicle having at least one closure panel constructed in accordance with an aspect of the disclosure.

FIG. 2 shows a vehicle 11 having a plurality of closure panel assemblies, including front door panel assemblies 12, a rear hatch lift gate closure panel assembly 13, at least one sliding side door panel assembly 15, wherein one or more of the panel assemblies can include a door module, also referred to as carrier module or carrier assembly 10 (FIGS. 3-5B), constructed in accordance with an aspect of the disclosure. The carrier assembly 10 includes a carrier 16 and is further shown, by way of example and without limitation, as including an actuator 21 configured in operable communication with a latch assembly 30 via a rod or cable, such as a Bowden cable 24, to selectively cinch the latch assembly 30.

Figure 3:
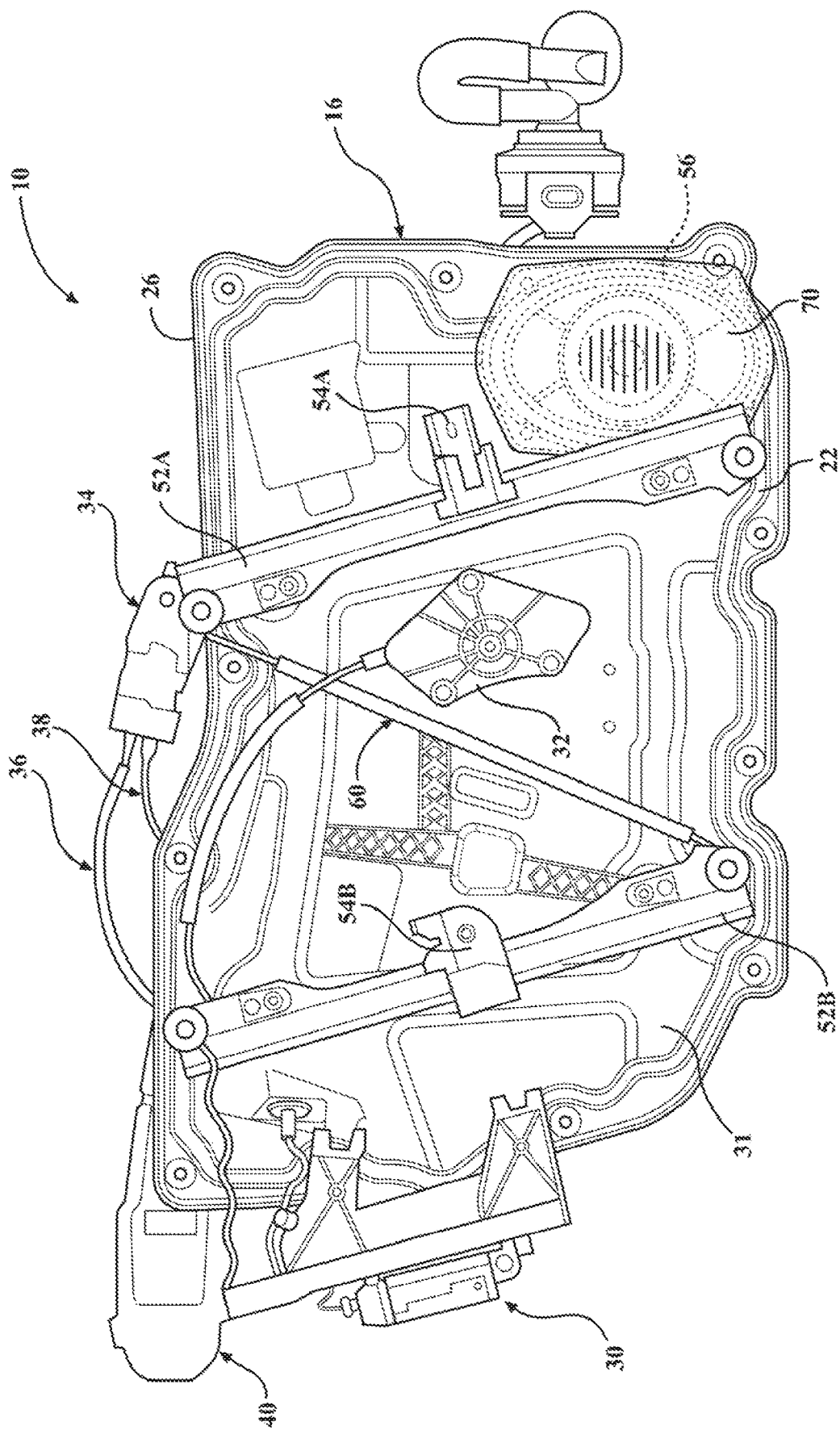
FIG. 3 is a plan view of a wet-side of a carrier module of a closure panel of FIG. 2.
Figure 4A:
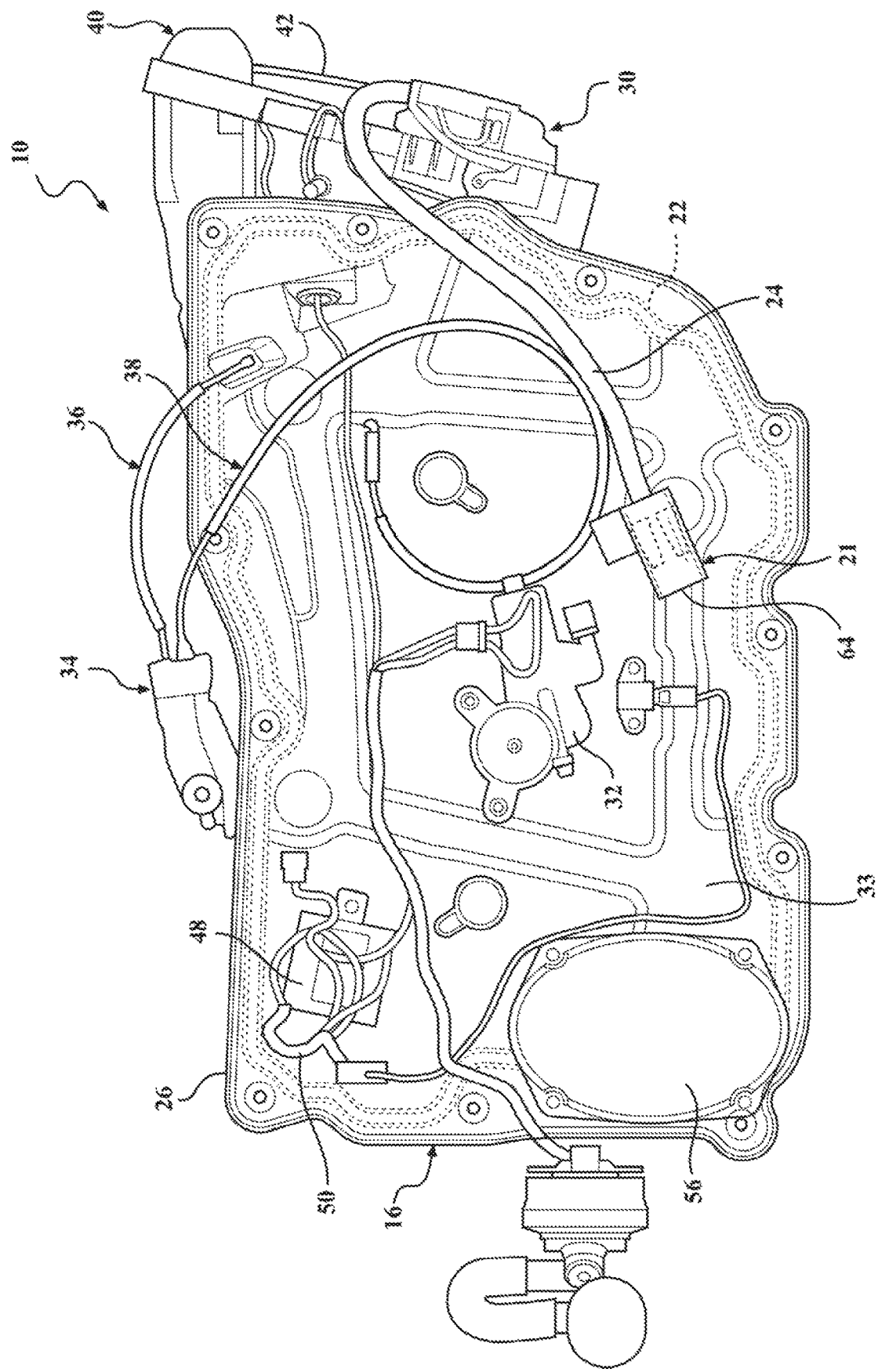
FIG. 4A is a plan view of a dry-side of the carrier module of FIG. 3.

FIG. 3 shows a first side 31 (wet-side) of the carrier assembly 10 of one of the panel assemblies of FIG. 2, shown as one of the front door panel assemblies, referred to hereafter as door 12, by way of example and without limitation. It is to be recognized that the carrier assembly 10 can be configured having any surface contours and outer peripheral shape as desired for application with any of the panel assemblies of FIG. 2, as well as for other applications, including, but not limited to deck lids and the like. FIG. 4 shows a second side 33 (dry-side) of carrier assembly 10. The first side 31 of the carrier assembly 10 shown in FIG. 3 is referred to as the "wet-side" because, when the carrier assembly 10 is installed in a vehicle closure panel of vehicle 11, the first side 31 faces outwardly, away from the passenger compartment, also referred to as interior cabin C, and may be exposed to an ambient external environment E as a result of apertures in the panel assembly (such as the large slot through which a window 14 moves between open and closed positions). In contrast, the second side 33 of the carrier assembly 10 shown in FIG. 3 is referred to as the "dry-side" because, when carrier assembly 10 is installed in a vehicle closure panel of vehicle 11, the carrier 16 of carrier assembly 10 seals the interior cabin C of the motor vehicle 11 against the ambient external environment E such that the second side 33, which faces toward the interior cabin C, is protected from the external environment E and remains dry.

Carrier assembly 10 is shown to include the carrier 16, which is generally plate-like in configuration, with undulating contours, also referred to as surface profiles, provided as desired for the intended components and application, thereby providing the carrier 16 having a variety of integrally formed three-dimensional features within the material of the carrier 16. Carrier 16 holds a variety of functional door hardware components. Carrier 16 can be formed as a structural component in the sense that the door hardware components may be mounted thereto without requiring additional fasteners to mount the components to the structural panel assembly after installation of carrier assembly 10 therein. As is understood, front door 12 includes a structural door panel body, referred to hereafter as door panel body 19, made up of a sheet metal inner door panel 20 joined to a sheet metal outer door panel 18 along their outer peripheral edge regions and/or elsewhere so as to define an internal door cavity 23 between the inner and outer door panels 20, 18. A window 14 is stored in internal door cavity 23 when moved to its opened position. Carrier 16 includes a circumferential sealing bead 22 which is configured to extend adjacent an outer periphery 26 of carrier 16 and surround an opening 28 in inner door panel 20 in sealed relation thereabout when carrier 16 is assembled and mounted against inner door panel 20. Since carrier 16 is impervious to water, the sealing bead 22 acts to prevent infiltration of debris and other forms of contamination, including moisture, from a wet side 27 to a dry side 29 into the passenger interior cabin C.

The carrier assembly 10 is shown carrying most, if not all, of the door hardware components for front door 12, by way of example and without limitation. Generally speaking, the functional hardware components secured to carrier 16 can, as shown, include the power-operated latch assembly 30, a power-operated window regulator 32, an inside handle unit 34 mechanically coupled to latch assembly 30 via an inside release mechanism 36 and via an inside lock/unlock mechanism 38, and an outside handle unit 40 mechanically coupled to latch assembly 30 via an outside release mechanism 42. The connector mechanisms can be Bowden cables and/or rod-links as is known. The functional hardware components are electrically coupled to an ECU 48 via a wiring harness 50. Carrier 16 further supports a pair of guide rails 52A, 52B which support corresponding lift brackets 54A, 54B for translational movement thereon. Lift brackets 54A, 54B support window 14 for movement along rails 52A, 52B between opened and closed positions. A cable and pulley-type window lift system 60 connects lift brackets 54A, 54B to a drum associated with power-operated window regulator 32. In addition to the door hardware components, carrier assembly 10 is further shown supporting a speaker 56 of a vehicle sound/entertainment system in a manner that optimizes the performance of the speaker 56, while resolving concern for privacy and sound transmission issues discussed above with regard to carrier 2 of FIG. 1.

Figure 5A:
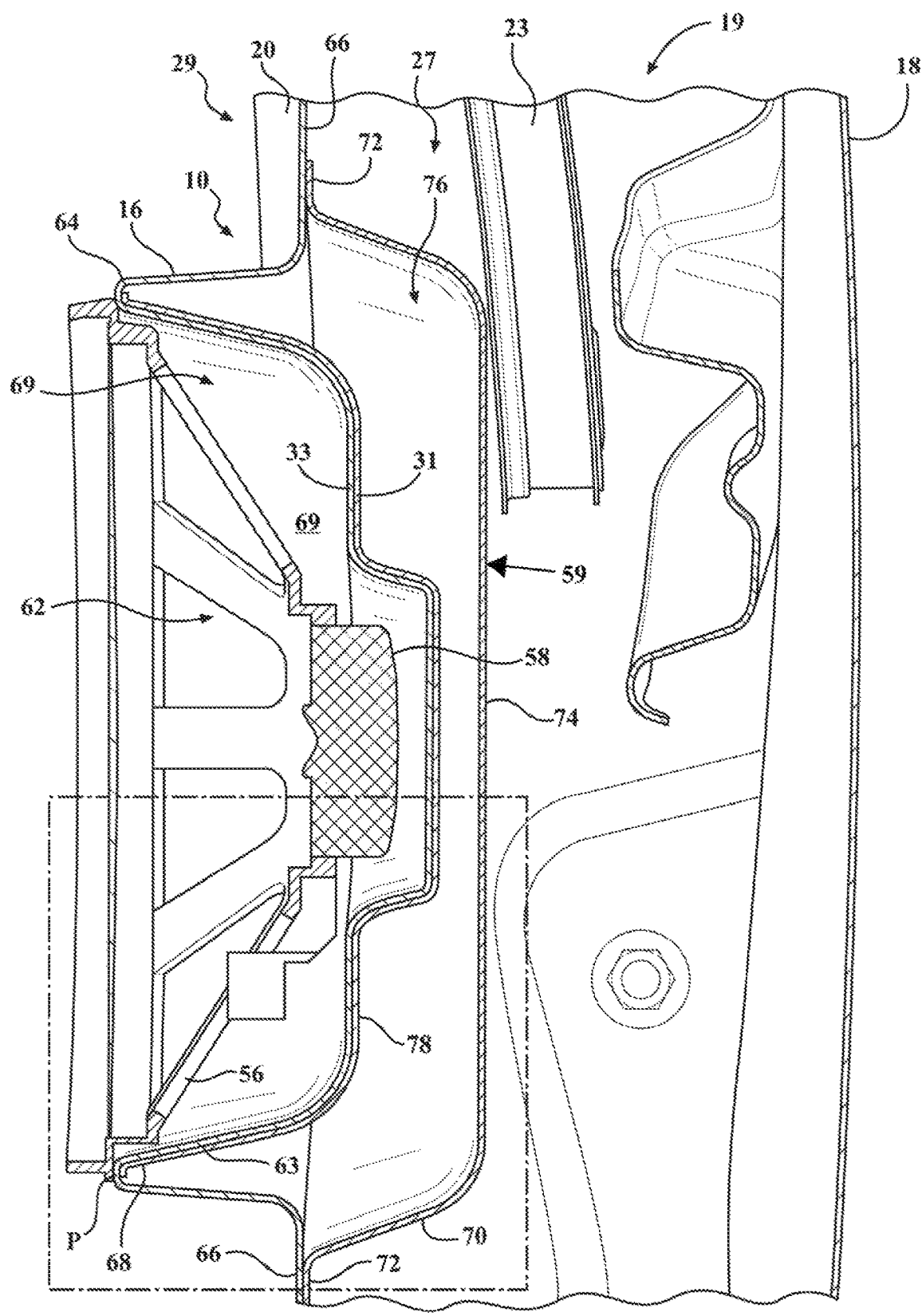
FIG. 5A is a view similar to FIG. 1 of the carrier module of FIGS. 2 and 3.
Figure 5B:
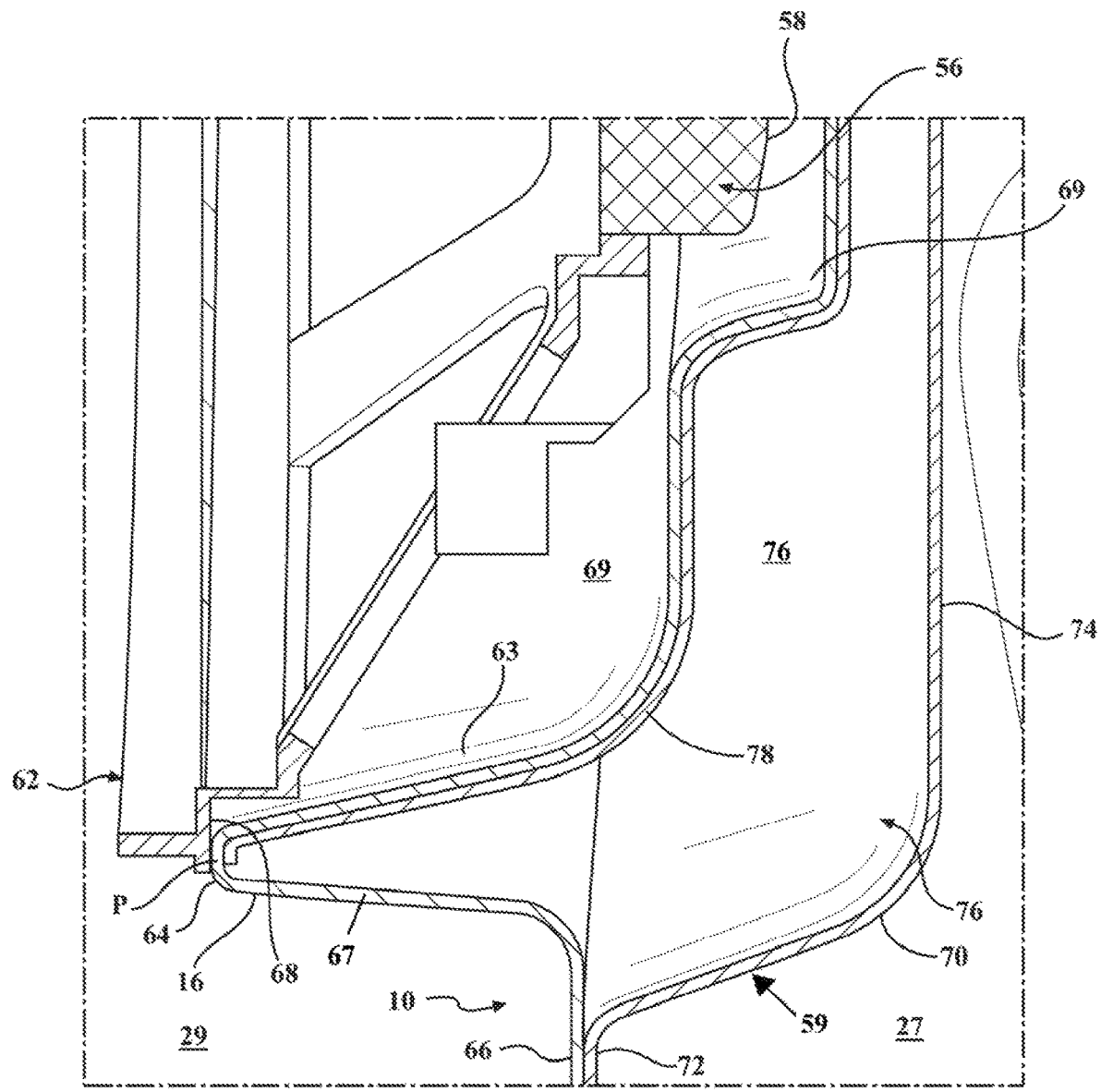
FIG. 5B is an enlarged view of a portion of the carrier module of FIG. 5A.
Figure 6A:
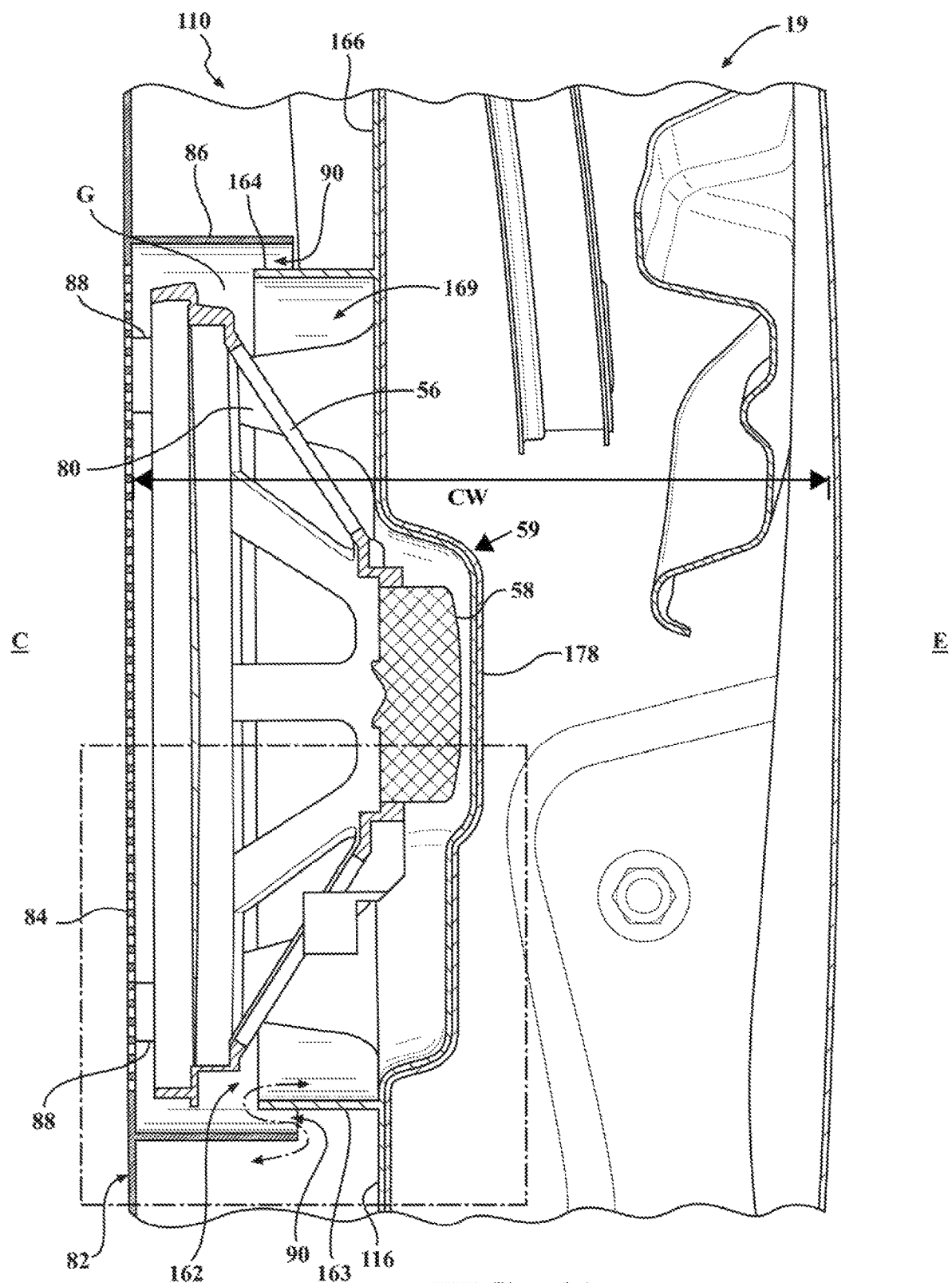
FIG. 6A is a view similar to FIG. 5A of a carrier module constructed in accordance with another aspect of the disclosure.

FIGS. 5A and 5B illustrate in greater detail aspects of one non-limiting embodiment of the carrier assembly 10. As discussed above, outer periphery 26 of carrier 16 is configured for attachment to the inner door panel 20 to close off or substantially close off the opening 28 therein to separate the wet side 27 of the door panel body 19 from a dry side 29 of the door panel body 19, such as facilitated via seal bead 22. The carrier 16 has a recessed pocket 62 formed radially inwardly of the outer periphery 26, such that the outer periphery 26 extends about pocket 62. The recessed pocket 62 is configured for receipt of at least a portion of the speaker 56, and is shown as receiving a rear side 58 of the speaker 56 therein. For example, as shown in FIG. 5A, recessed pocket 62 is shown to receive speaker 56, and for example is configured to surround at least a portion of speaker 56. Recessed pocket 62 is provided to match or closely match with the profile of the speaker 56 (e.g. the radial extent and/or cross-sectional extent of speaker 56). For example, as shown in FIG. 6A, recessed pocket 62 is shown to receive a magnet of speaker 56, and for example is configured to surround such a portion and/or other portions of speaker 56. The pocket 62 is shown, by way of example and without limitation, as having an annular pocket wall 63 extending to a raised lip 64 at its outer periphery, with the pocket 62, pocket wall 63 and lip 64 thereof being formed as a monolithic piece of material with carrier 16. Pocket wall 63 may be shaped in manners so as to match the receiving speaker 56, such as round or oval, by way of example and without limitation. The pocket wall 63 is shown as extending laterally outwardly from a generally planar section 66 of carrier 16 toward the wet dry side 29 and then being reverse folded/formed at lip 64 to depend back toward the wet side 27 into the recessed pocket 62. The pocket wall 63 is provided to match or closely match with the shape of the underside of speaker 56 so as to reduce the volume occupied by the extending profile of the recessed pocket 62 in a direction of the wet side 27, thereby freeing volume within internal door cavity 23 and reducing interference with components housed within internal door cavity 23, such as for example window 14 and guide rails 52A, 52B, and/or allow the cross-width (CW) extent of the door 12 to be reduced. Accordingly, the recessed pocket 62 may extend from a carrier wall 67 extending from the generally planar section 66 toward the dry side 29, such that the recessed pocket 62 extent that projects beyond the generally planar section 66 towards the wet side 27 is minimized. The lip 64 interconnecting carrier wall 67 and annular pocket wall 63 is configured at a peak P to conform with the shape of an outer periphery of the speaker 56 to provide an attachment/support surface for a mount shoulder or flange 68 of speaker 56. Lip 64 may be considered as part of carrier wall 67 or as part of annular pocket wall 63, and speaker 56 may be mounted to either so as to position at least a portion of the speaker 56 away from the wet side 27 to minimize the intrusion of the speaker into the cavity 23. The recessed pocket 62 is sized to provide a clearance fit with the rear side 58 of speaker 56, to thereby provide ample open space 69 between the rear side 58 and the pocket 62 to allow for desired air presence behind speaker 56 for allowing the speaker diaphragm 65, formed from treated paper for example, to vibrate and transmit sound waves. The pocket 62 can be formed being free or substantially free (may have small openings for the passage of electrically wiring therethrough, with the small openings being sealed against the passage of air/fluid) of through openings, thereby being impervious to the flow of moisture and noise therethrough. Accordingly, the speaker 56 is maintained in its entirety on the dry side 29 of the door 12, thereby being protected against damage from moisture on the wet side 27, and further, noise is kept from exiting the door panel assembly 12 or entering the interior cabin C of vehicle 11 in the region of the speaker 56. Accordingly, the ability to direct sound from the speaker 56 into the interior cabin C, as illustrated by reflected sound waves 71a, as intended, is enhanced; the noise from the outside environment E is inhibited from entering the interior cabin C; and the privacy of conversation taking place in the interior cabin C is enhanced.

Figure 4B:
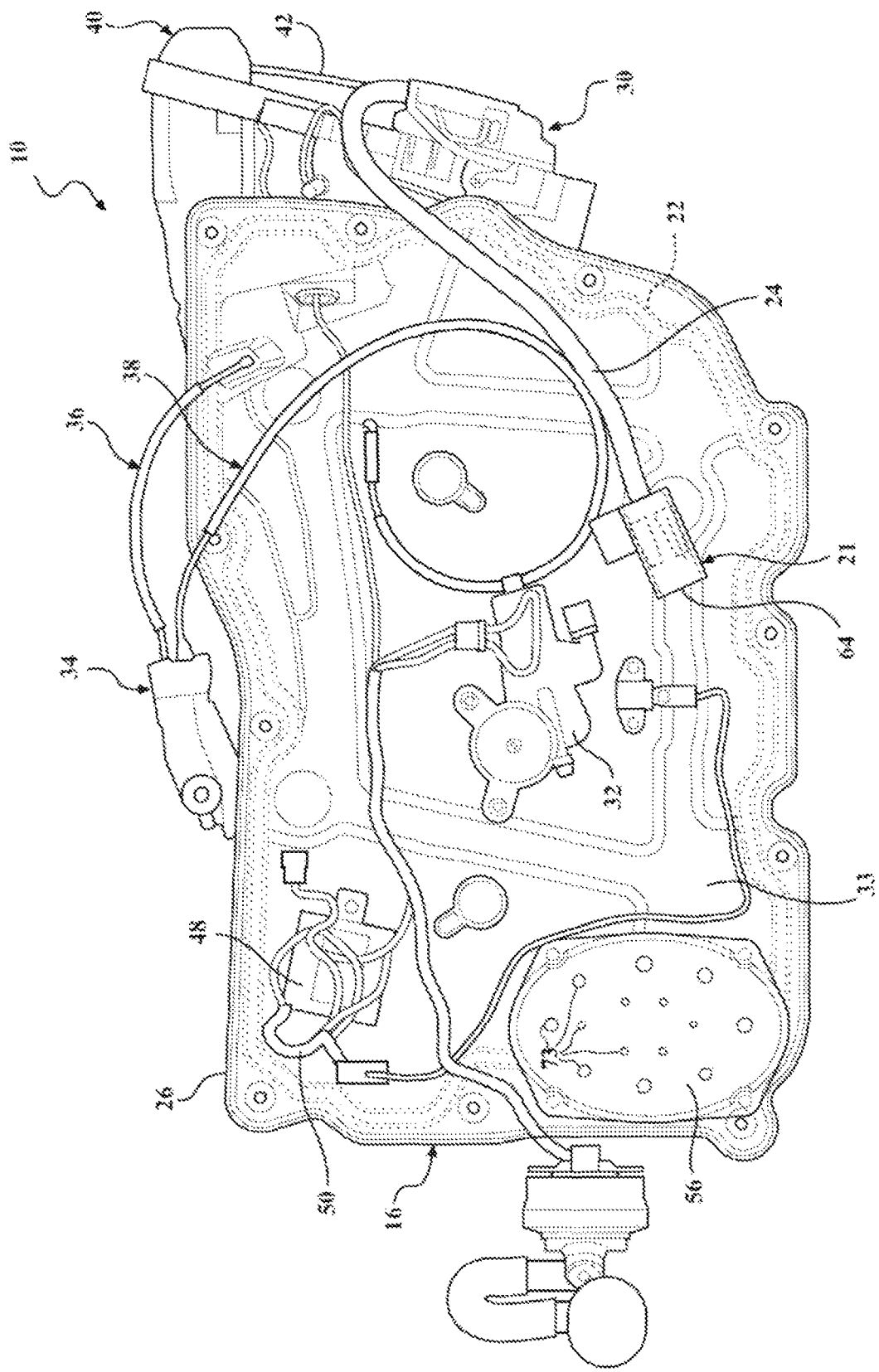
FIG. 4B is a plan view of a dry-side of the carrier module of FIG. 3, in accordance with another illustrative embodiment.
Figure 5C:
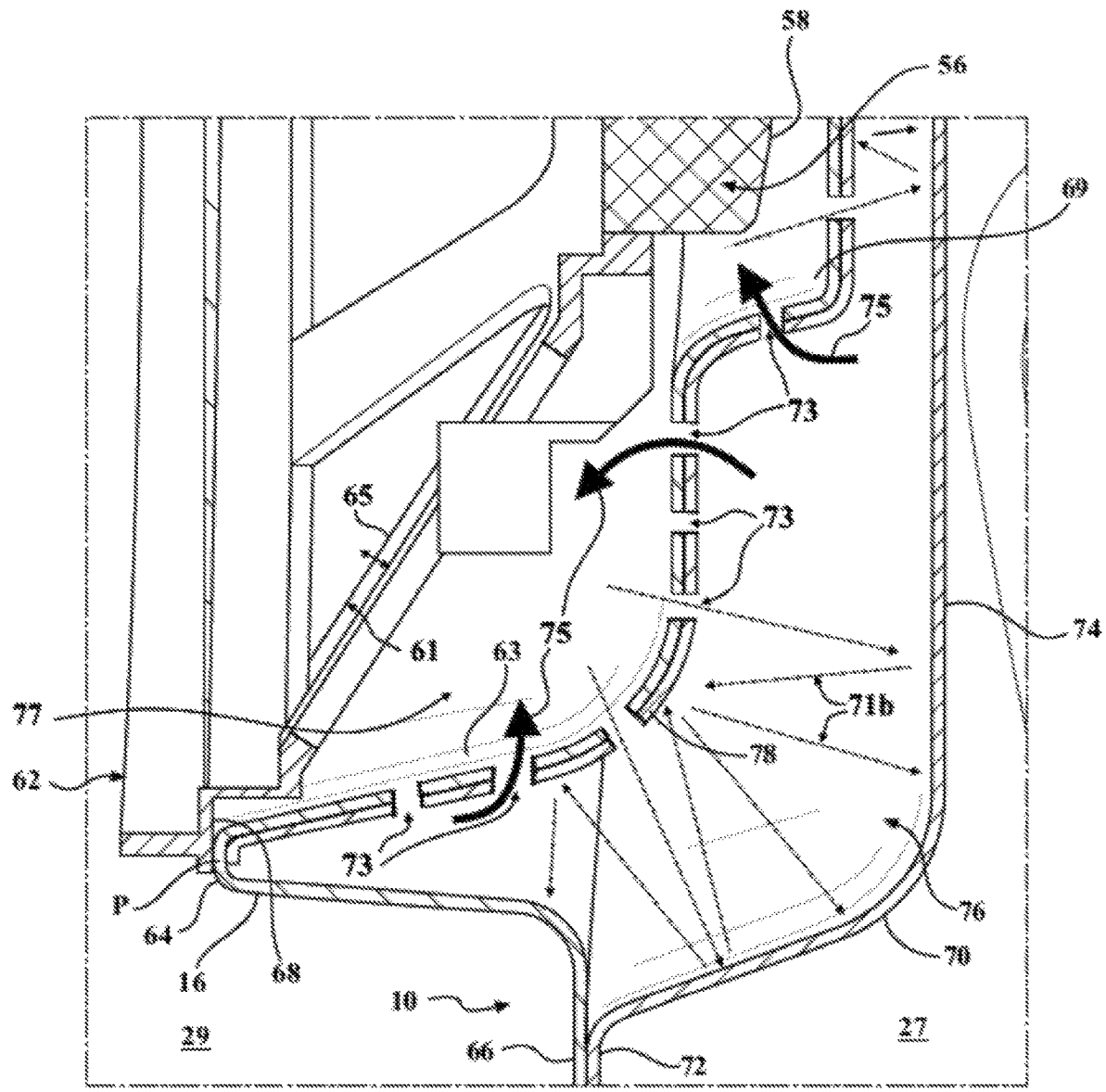
FIG. 5C is a view similar to FIG. 5B of a carrier module in accordance with another illustrative embodiment.

To further facilitate keeping noise from exiting or entering the vehicle 11 in the region of the speaker 56, an acoustic and/or structural barrier, referred to hereafter as barrier 70, can be fixed immediately behind speaker 56, in underlying alignment therewith, to the first side 31 of the carrier 16 facing the wet side 27 of the door panel body. The barrier 70 is shown, by way of example and without limitation, as being generally bowl-shaped, having an outer planar lip 72 configured for attachment to the first side 31 of the generally planar second 66 of carrier 16, and having a recessed bowl portion 74 extending away from the inner door panel 20 toward the outer door panel 18. Upon the barrier 70 being fixed to carrier 16, the recessed bowl portion 74 is spaced in alignment with and spaced laterally away from the annular pocket wall 63 and space 69 of recessed pocket 62, thereby forming a separate isolated and bounded first air chamber, referred to hereafter as air chamber 76, between the recessed pocket 62 of carrier 16 and barrier 70. Barrier 70 may also function as a reinforcing structure to stiffen the carrier 16 about the speaker 56 and prevent the development of resonant frequencies in carrier 16. Upon the barrier 70 being fixed to carrier 16, barrier 70 isolates, or fluidly decouples, the wet side 27 from the bounded air chamber 76, and the space 69 forming a second air chamber, referred to hereafter as another air chamber 77, on a side of the recessed pocket 62 facing the dry side 29 of the door panel assembly 12 in the configuration where another air chamber 77 and air chamber 76 are fluidly coupled with one another, for example if there is provided one or more through openings(s) or aperture(s) 73 formed in annular pocket wall 63 as shown in FIGS. 4B and 5C. For example, a plurality, including at least two openings 73 may be provided. Through openings(s) or aperture(s) 73 are provided to interconnect a reservoir volume of air chamber 76 for allowing air flow 75 therebetween as a result of the vibration of diaphragm 65 of speaker 56 which may increase the acoustic performance of the speaker 56 by providing a quasi-closed back speaker design whereby sound is directed towards the dry side 29 by the reflection against recessed pocket 62 while reservoir air flow supplied from air chamber 76 is allowed to cycle between air chambers 76, 77 in response to the vibration of diaphragm 65. Sound waves entering air chamber 65 are attenuated therein to reduce or eliminate the propagation of sound further onwards and towards the wet side 27 in a manner as described herein above. Barrier 70 may be fixed to carrier 16, for example using adhesive, to sealingly engage with carrier 16 to prevent sound and/or water from propagating therebetween, for example to prevent water from the wet side 27 from leaking between the interface of the barrier 70 and the carrier 16, and to prevent sound from escaping from air chamber 76 and into internal cavity 23 or into wet side 27. In another example, barrier 70 may be formed as part of the carrier 16, for example as part of an injection molding process, such that an integral interface is formed to provide the sealed or sealing engagement between the barrier 70 and the carrier 16. Such a configuration whereby sound is attenuated and/or prevented from onwards propagation towards the wet side 27 presents barrier 70 as an acoustic baffle 59 that is coupled with carrier 16 and/or the recessed pocket 62. Acoustic baffle 59 is configured to reduce the strength level of the acoustic vibrations generated by the speaker 56 and transmitted to the wet side 27, for example as a result of a vibration of the recessed pocket 62 by the speaker 56 or by soundwaves generated by the diaphragm 65 of the speaker 56. In the illustrative example of FIG. 5A, acoustic baffle 59 is coupled with the carrier 16, such as within or adjacent the region of recessed pocket 62, such that it surrounds the area of the carrier 16 immediately adjacent the speaker 56. The bounded air chamber 76 can be configured to be air tight and hermetically sealed, thereby acting as a resonator chamber for sound, thus, acting to attenuate sound waves 71b therein as contained and reflected therein, without guiding sound waves towards the outer door panel 18 and/or into the internal cavity 23, and may optionally further act to direct sound from the speaker 56 into the interior cabin C and inhibiting noise from the outside environment E from entering the interior cabin C. Optionally, resonator chamber 76 can be tuned to suppress certain sound frequencies, while amplifying others using acoustic resonance principles (e.g. attenuate lower frequency sound waves tending to vibrate the carrier 16 increasing the likely hood of unwanted noise due to vibrating components, while optionally amplifying higher frequency sound waves, as but a non-limiting example). In another aspect, a water shield/barrier sealed to the inner door panel 20 on the wet side 27 may be provided, with the water shield comprising sound dampening material, such as cork, or ethylene-vinyl acetate, may be provided with the carrier 16.

To further yet facilitate keeping noise from exiting or entering the cabin C of vehicle 11 in the region of the speaker 56, a sound dampening material 78, such a various open or closed cell foams, polymers, and the like, as are known in the sound dampening art, can be applied to at least one surface of the recessed pocket 62 and/or barrier 70, and shown, by way of example and without limitation, as being bonded to the recessed pocket 62 on a side of the pocket 62 facing barrier 70. The sound dampening material 78 can be bonded or fixed to the desired surface via any suitable mechanism, including being sprayed on, adhered via a suitable adhesive or overmolded thereon, for example.

Now referring to 5C, there is illustrated an arrangement whereby the acoustic baffle 59, and for example the air chamber 76, is fluidly coupled with the another air chamber 77 bounded by recessed pocket 62, for example with another air chamber 77 defined between pocket wall 63 and an underside 61 of speaker 56.

Figure 6B:
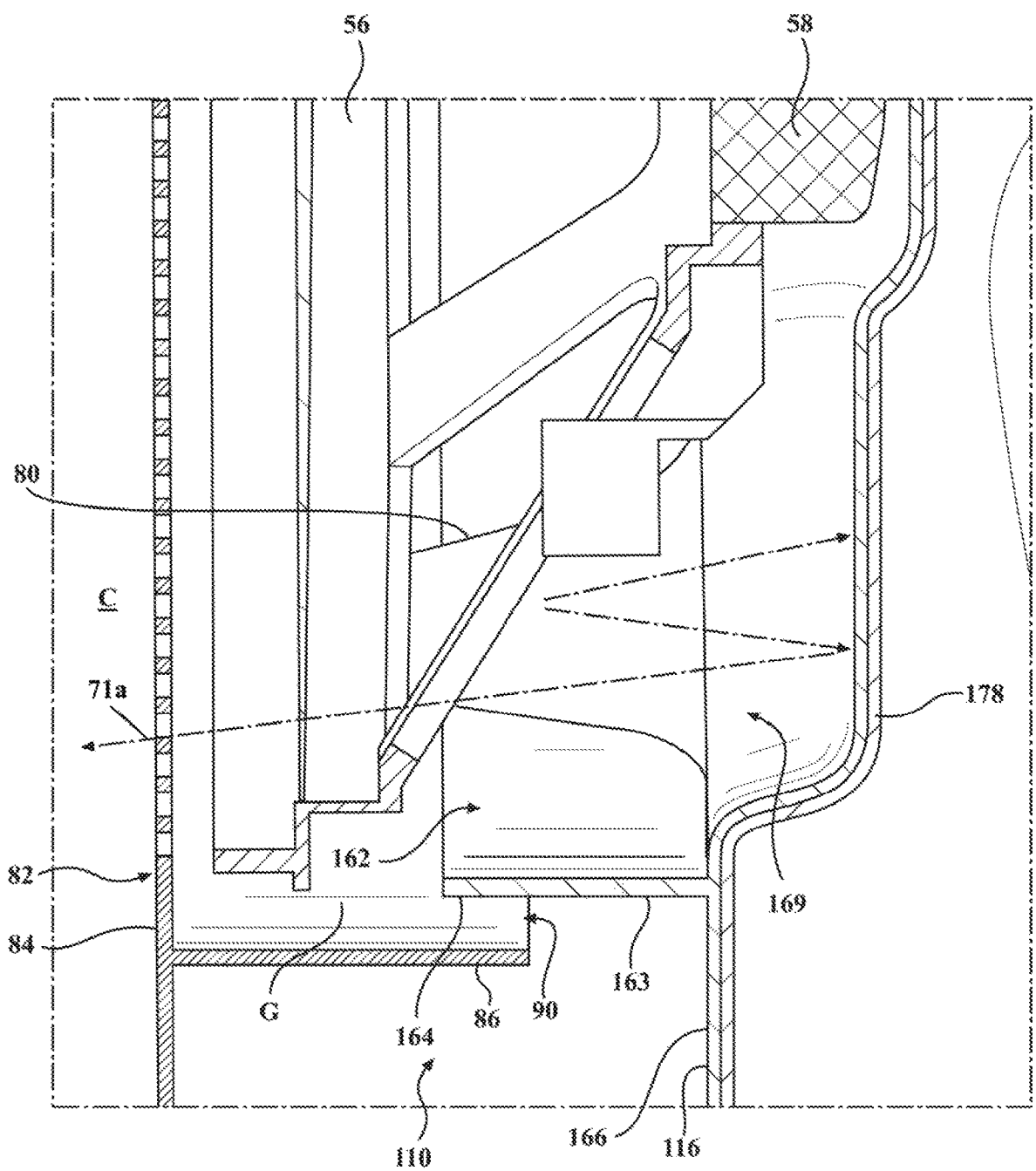
FIG. 6B is an enlarged view of a portion of the carrier module of FIG. 6A.

FIGS. 6A and 6B illustrate in greater detail aspects of a carrier assembly 110 constructed in accordance with another aspect of the disclosure, wherein the same reference numerals as used above, offset by a factor of 100, are used to identify like features.

Carrier assembly 110 has a carrier 116 similar to that discussed above for carrier 16, configured for attachment of the various door hardware components thereto, as discussed above, as well as the speaker 56. As discussed above, carrier 116 has an outer periphery configured for attachment to the inner door panel 20 to close off or substantially close off the opening 28 therein to separate the wet side 27 of the structural door body 19 from the dry side 29 of the structural door panel body 19, such as facilitated via seal bead 22. The carrier 116 has a recessed pocket, referred to hereafter as pocket 162, formed radially inwardly of the outer periphery 26, as discussed above for pocket 62. Accordingly, the pocket 162 is configured for receipt of at least a portion of the speaker 56, and is shown as receiving the rear side 58 of the speaker 56 received therein, with the entirety of the speaker 56 being maintained on the dry side 29 of the door panel assembly 12. The pocket 162 is shown, by way of example and without limitation, as being bounded in part by an annular pocket wall 163 extending toward the dry side 29 of the door panel body 19 to a free edge, also referred to as raised lip 164, at its outer periphery, with the pocket 162, pocket wall 163 and lip 164 thereof being formed as a monolithic piece of material with carrier 116. The pocket wall 163 is shown as extending laterally outwardly from a generally planar section 166 of carrier 116 toward the dry side 29 of door panel body 19 for at least partial receipt of speaker 56 in pocket 162 bounded by pocket wall 163. However, unlike the lip 64 of wall 63 on carrier 16, the lip 164 is not directly attached to speaker 56, but rather, is spaced from speaker 56 by an annular gap G to allow air to flow through gap G from the dry side 29 to an open cavity, also referred to as open space 169, behind speaker 56, thereby facilitating optimal performance of speaker 56, as will be understood by one possessing ordinary skill in the art of speakers. A sound dampening material 178, as discussed above for sound dampening material 78, can be applied to at least one surface of the recessed pocket 162, and shown, by way of example and without limitation, as being bonded to a backside of the recessed pocket 162 facing the wet side 27 of the door panel body 19.

A plurality of mount features 80 extend from within the pocket 162 of carrier 116, wherein the mount features 80 are configured for mounting the speaker 56 directly thereto. The mount features 80 can be configured as separate pieces of material or as monolithic pieces of material with carrier 116, as desired. Accordingly, it is to be understood that mount features 80 can be made in the same process used to construct carrier 116, such as molding process, by way of example and without limitation. In an embodiment, the plurality of mount features 80 extend outwardly from the pocket wall 163, and may form part of the pocket wall 163 as extensions outwardly therefrom.

A shroud 82 is configured to overlie the pocket 162 on the dry side 29 of the door panel body 19. The shroud 82 has a planar or generally (meaning the wall my undulate or extend out from a plane) planar wall 84 and an annular, cylindrical or generally cylindrical, tubular shroud rib, also referred to as shroud wall 86, extending from the generally planar wall 84 toward the wet side 27 of the door panel body 19. Shroud 82 can be supported via support members 88 extending from speaker 56 or from carrier 116, which can be configured to enhance the rigidity of speaker 56, thereby enhancing its performance. Shroud 82 can be formed from a speaker grill formed in a vehicle inner panel covering, or trim, separate from carrier module 110. The annular pocket wall 163 and the tubular shroud wall 86 extend beyond one another in spaced, overlapping relation to mate with one another to form a serpentine airflow labyrinth 90 therebetween. As such, air from the dry side 29 is free to flow through airflow labyrinth 90, which is formed in part via gap G, behind speaker 56 within pocket 162 to facilitate optimizing the performance of speaker 56 (for example, to regulate the amount of air the diaphragm may move), similar to through openings 73. Airflow labyrinth 90 may not be configured to guide and disperse sound waves emanating from the backside 58 to create an open back speaker configuration, nor affect the frequencies of sound generated by the speaker 56, but maintains a closed back or substantially closed back speaker configuration while allowing a regulated amount of air to be supplied to and from the back side 58 of speaker 56. As a result a focused sound may be generated and directed from the speaker 56 towards the dry side 29. Further, airflow labyrinth 90 is not provided adjacent the wet side 27, for example the airflow labyrinth 90 is not formed in part with a carrier 16 portion interfacing with wet side 27, and as a result sound propagation towards the wet side 27 is eliminated or reduced, and additional sound dampening material provided adjacent the airflow labyrinth 90 does not have to be provided.

Figure 6C:
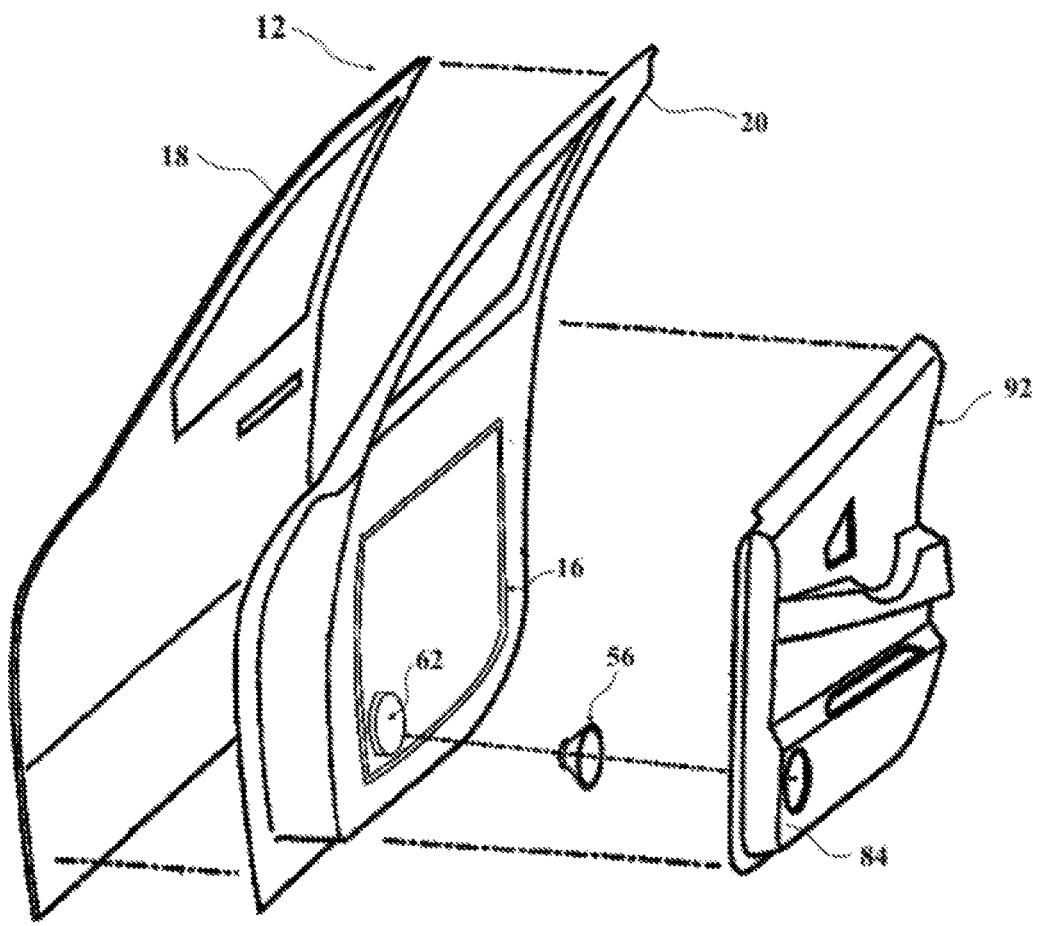
FIG. 6C is a disassembled perspective view of the closure panel of FIG. 2, in accordance with an illustrative example.

Now referring to FIG. 6C, planar wall 84 is illustrated as part of a trim panel 92 configured for attachment to inner door panel 20 such that trim panel 92 covers or overlies carrier module 16 to provide a finished appearance to door 12 as viewed from an interior of the vehicle 11. For example, shroud wall 86 may be provided to extend from trim panel 92, and may be integrally formed with trim panel 92 or provided as a separate attachment thereto.

Accordingly, as discussed above with regard to carrier module 10, carrier module 110 addresses at least those issues discussed above with regard to carrier 2. In particular, carrier module 110 improves the ability to maintain the privacy of conversation held within the interior cabin C of the vehicle 11; inhibits sound permeation to the outside or external environment E; inhibits sound permeation into the internal cabin C from the external environment E; and enhances overall performance of the speaker 56 by directing sound therefrom to the internal cabin C rather than to the external environment E and via increased rigidity to the speaker 56. Accordingly, while listening to speakers 56, a normal volume level may by heard, as desired, without having to dramatically increase the volume level as when the sound is allowed to be directed to the external environment E and while noise from the external environment E is allowed to enter interior cabin C.

In accordance with yet a further aspect, and with reference to FIG. 7, a method 1000 of constructing a vehicle door carrier module 10, 110 for a motor vehicle 11 having a structural door panel body 19 including an outer door panel 18 and an inner door panel 20 defining an internal cavity 23 therebetween, with the inner door panel 20 having an opening 28, is provided. The method 1000 of constructing the vehicle door carrier module 10, 110 includes: a step 1100 of molding a carrier 16, 116 having an outer periphery 26 configured for attachment to the inner door panel 20 about the opening 28 therein to separate a wet side 27 of the door panel body 19 from a dry side 29 of the door panel body 19 and molding the carrier 16, 116 having a recessed pocket 62, 162 being substantially free of through openings, the recessed pocket 62, 162 being configured for receipt of a rear side 58 of a speaker 56 therein.

In accordance with yet a further aspect, the method of constructing the vehicle door carrier module can further include fixing at least one of a barrier 70 and a shroud 82 to the carrier 16, 116. The barrier 70 can be fixed to a side of the carrier 16, 116 facing the wet side 27 of the door panel body 19, with the barrier 70 and the carrier 16, 116 bounding an air chamber 76 therebetween. The shroud 82 can be configured to overlie the pocket 62, 162 on the dry side 29 of the door panel body 19.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle door carrier module for a motor vehicle having a structural door panel body including an outer door panel and an inner door panel defining an internal cavity therebetween, with the inner door panel having an opening, the vehicle door carrier module comprising:

a carrier having an outer periphery configured for attachment to the inner door panel about the opening therein to separate a wet side of the structural door panel body from a dry side of the structural door panel body and having a recessed pocket, radially inwardly of the outer periphery, configured for receipt of a rear side of a speaker therein; and at least one of a barrier coupled to the carrier on a side of the carrier facing the wet side of the structural door panel body in laterally spaced relation from the recessed pocket and a shroud overlying the recessed pocket in laterally spaced relation from the recessed pocket on a side of the carrier facing the dry side of the structural door panel body.

2. The vehicle door carrier module of claim 1, wherein the barrier and the carrier form an air chamber therebetween.

3. The vehicle door carrier module of claim 2, further including a sound dampening material disposed inside the air chamber.

4. The vehicle door carrier module of claim 3, wherein the sound dampening material is bonded to at least one of a backside of the recessed pocket facing the wet side of the door panel body and a side of the barrier facing the dry side of the structural door panel body.

5. The vehicle door carrier module of claim 2, wherein the barrier is impervious.

6. The vehicle door carrier module of claim 5, wherein the recessed pocket is impervious.

7. The vehicle door carrier module of claim 6, wherein the barrier and the carrier are in sealing engagement such that the air chamber is fluidly decoupled from the wet side of the structural door panel body.

8. The vehicle door carrier module of claim 2, wherein the recessed pocket includes one or more through openings fluidly coupling another air chamber between the recessed pocket and a rear side of a speaker with the air chamber between the barrier and the carrier.

9. The vehicle door carrier module of claim 1, wherein the recessed pocket is bounded in part by an annular pocket wall extending away from a plane of the carrier and toward the dry side of the structural door panel body, wherein the annular pocket wall is configured to mate with a tubular shroud wall of the shroud extending toward the wet side of the structural door panel body in overlapping relation with one another to form an air flow labyrinth therebetween.

10. The vehicle door carrier module of claim 9, further including a plurality of mount features extending from the carrier within the recessed pocket and being configured for mounting the speaker thereto.

11. A vehicle panel assembly, comprising:
a structural door panel body having an outer door panel and an inner door panel defining an internal cavity therebetween, the inner door panel having an opening;
a carrier having an outer periphery configured for attachment to the inner door panel to substantially close off the opening therein to separate a wet side of the structural door panel body from a dry side of the structural door panel body and having a recessed pocket, radially inwardly of the outer periphery, configured for receipt of a rear side of a speaker therein; and
at least one of a barrier coupled to the carrier on a side of the carrier facing the wet side of the structural door panel body in laterally spaced relation from the recessed pocket and a shroud overlying the recessed pocket in laterally spaced relation from the recessed pocket on a side of the carrier facing the dry side of the structural door panel body.

12. The vehicle panel assembly of claim 11, wherein the recessed pocket is bounded in part by a carrier wall extending away from a plane of the carrier and toward the dry side of the structural door panel body, said carrier wall being configured for mounting the speaker thereto.

13. The vehicle panel assembly of claim 12, further including a trim panel configured for attachment to the inner door panel on the dry side of the structural door panel body to overlie the carrier, wherein a portion of the trim panel forms the shroud.

14. The vehicle panel assembly of claim 11, wherein the recessed pocket is bounded in part by an annular pocket wall extending away from a plane of the carrier and toward the dry side of the structural door panel body, wherein the annular pocket wall is configured to overlap a tubular shroud wall of the shroud extending toward the wet side of the structural door panel body to form an air flow labyrinth therebetween.

15. The vehicle panel assembly of claim 14, further including a plurality of mount features extending from the carrier within the recessed pocket and being configured for mounting the speaker thereto.

16. The vehicle panel assembly of claim 11, wherein the barrier and the carrier form an air chamber therebetween.

17. The vehicle panel assembly of claim 16, wherein the air chamber is isolated from the wet side of the structural door panel body.

18. The vehicle panel assembly of claim 17, wherein the air chamber is fluidly coupled with another air chamber within the recessed pocket on the side of the carrier facing the dry side of the structural door panel body.

19. A method constructing a vehicle door carrier module for a motor vehicle having a structural door panel body including an outer door panel and an inner door panel defining an internal cavity therebetween, with the inner door panel having an opening, the method of constructing the vehicle door carrier module, comprising:
molding a carrier having an outer periphery configured for attachment to the inner door panel about the opening therein to separate a wet side of the structural door panel body from a dry side of the structural door panel body and having a recessed pocket, the recessed pocket being configured for receipt of a rear side of a speaker therein; and
fixing at least one of a barrier and a shroud to the carrier, the barrier being fixed to a side of the carrier facing the wet side of the structural door panel body, with the barrier and the carrier bounding an air chamber therebetween and the shroud being configured to overlie the pocket on the dry side of the structural door panel body.

20. The method of claim 19, further including isolating the air chamber between the barrier and the carrier from the wet side of the structural door panel body.

* * * * *